United States Patent
Rella et al.

(10) Patent No.: US 11,340,595 B2
(45) Date of Patent: May 24, 2022

(54) METHOD FOR MANAGING AND CONTROLLING PRODUCTION RESOURCES WITH ONE OR MORE WORK CELLS AND INDUSTRIAL INSTALLATION OR PRODUCTION SYSTEM THEREFOR, RESPECTIVELY

(71) Applicant: WITTMANN TECHNOLOGY GMBH, Vienna (AT)

(72) Inventors: Johannes Rella, Payerbach (AT); Peter Michael Wittmann, Leobendorf (AT)

(73) Assignee: WITTMANN TECHNOLOGY GMBH, Vienna (AT)

( * ) Notice: Subject to any disclaimer, the term of this patent is extended or adjusted under 35 U.S.C. 154(b) by 195 days.

(21) Appl. No.: 16/634,387

(22) PCT Filed: Jul. 17, 2018

(86) PCT No.: PCT/AT2018/060151
§ 371 (c)(1),
(2) Date: Jan. 27, 2020

(87) PCT Pub. No.: WO2019/018868
PCT Pub. Date: Jan. 31, 2019

(65) Prior Publication Data
US 2021/0116893 A1  Apr. 22, 2021

(30) Foreign Application Priority Data
Jul. 28, 2017  (AT) ............................. A50630/2017

(51) Int. Cl.
*G05B 19/41* (2006.01)
*G06F 8/65* (2018.01)
*G05B 19/418* (2006.01)

(52) U.S. Cl.
CPC ..... *G05B 19/4185* (2013.01); *G05B 19/4183* (2013.01); *G06F 8/65* (2013.01)

(58) Field of Classification Search
None
See application file for complete search history.

(56) References Cited

U.S. PATENT DOCUMENTS 6,285,966 B1    9/2001  Brown et al.
6,856,844 B1 *  2/2005  McKenzie ......... G05B 19/4183
                                                    700/219

(Continued)

FOREIGN PATENT DOCUMENTS

DE      699 33 895      5/2007
DE   10 2007 039428     2/2009

(Continued)

OTHER PUBLICATIONS

International (PCT) Search Report form PCT/ISA/210 conducted in Int'l Appln. No. PCT/AT2018/060151 (dated Nov. 20, 2018) w/ an English translation.

(Continued)

*Primary Examiner* — Philip Wang
*Assistant Examiner* — Rongfa P Wang
(74) *Attorney, Agent, or Firm* — Greenblum & Bernstein, P.L.C.

(57) ABSTRACT

An industrial installation or production facility and a method for managing and controlling production resources with one or more work cells. Certain production resources are organized into work cells, which are each formed from at least one processing machine of the plastics-processing industry and at least one peripheral device. The production resources are connected to a work cell controller, and are automatically detected by the work cell controller, whereupon the work cell controller performs the communication or data (Continued)

exchange with the company-internal network, e.g., an intranet and/or an internet, and with the production resources of the work cell, and establishes direct communication between the production resources. A software update can be performed in the work cell controller during the operation of the work cell. Furthermore, the work cell controller creates a list and assigns addresses for the connected production resources.

16 Claims, 2 Drawing Sheets

(56) References Cited

U.S. PATENT DOCUMENTS

| | | | | |
|---|---|---|---|---|
| 8,270,962 B1* | 9/2012 | Mauer | ............... | H04M 1/72418 |
| | | | | 718/1 |
| 8,880,204 B2* | 11/2014 | Frei | ............... | G06F 13/10 |
| | | | | 710/305 |
| 9,180,617 B2* | 11/2015 | Tsai | ............... | B29C 45/7666 |
| 9,387,619 B2* | 7/2016 | See | ............... | B29C 48/29 |
| 9,529,348 B2* | 12/2016 | Kephart | ............... | G06F 30/20 |
| 9,529,583 B2* | 12/2016 | Bradley | ............... | H04L 67/1044 |
| 9,733,264 B2* | 8/2017 | Knecht | ............... | G01N 35/0099 |
| 10,528,479 B2* | 1/2020 | Wang | ............... | G06F 9/44521 |
| 2005/0090910 A1* | 4/2005 | Dolansky | ............... | G05B 19/0426 |
| | | | | 700/20 |
| 2010/0217894 A1 | 8/2010 | Papenfort et al. | | |
| 2012/0246376 A1 | 9/2012 | Kolblin et al. | | |
| 2013/0158709 A1* | 6/2013 | Shi | ............... | B25J 9/0084 |
| | | | | 901/47 |
| 2014/0067108 A1* | 3/2014 | Pedigo | ............... | G05B 19/41865 |
| | | | | 700/108 |
| 2014/0358257 A1 | 12/2014 | Fries et al. | | |
| 2015/0100674 A1* | 4/2015 | Chiche | ............... | H04L 61/103 |
| | | | | 709/222 |
| 2017/0331765 A1* | 11/2017 | Sharma | ............... | H04L 41/0213 |
| 2019/0366641 A1* | 12/2019 | Innes | ............... | B33Y 30/00 |
| 2021/0025791 A1* | 1/2021 | Sievert | ............... | G06K 7/1413 |
| 2021/0116893 A1* | 4/2021 | Rella | ............... | G05B 19/4185 |

FOREIGN PATENT DOCUMENTS

| | | |
|---|---|---|
| DE | 10 2009 045386 | 4/2011 |
| DE | 10 2011 082962 | 1/2013 |
| EP | 1 524 566 | 4/2005 |

OTHER PUBLICATIONS

International (PCT) Written Opinion form PCT/ISA/237 conducted in Int'l Appln. No. PCT/AT2018/060151 (dated Nov. 20, 2018).
Translation of International Preliminary Examination Report forms PCT/IB/338 & PCT/IPEA/409 conducted in Int'l Appln. No. PCT/AT2018/060151 (dated Feb. 6, 2020).

* cited by examiner

METHOD FOR MANAGING AND CONTROLLING PRODUCTION RESOURCES WITH ONE OR MORE WORK CELLS AND INDUSTRIAL INSTALLATION OR PRODUCTION SYSTEM THEREFOR, RESPECTIVELY

BACKGROUND

1. Field of the Invention

The present invention relates to a method for managing and controlling production resources comprising one or more work cells (2 to 4) and an industrial installation or production system.

2. Description of the Background

Processes and methods for networking industrial installations in which the individual production machines, such as an injection molding machine, a temperature control unit, a granule dryer, etc. are networked are per se known from the art. Here, the individual devices are connected to a network by a network specialist, where the network specialist makes the necessary settings on these devices, in particular assigning corresponding addresses. It is then necessary for another expert to configure the individual devices and establish an internal communication link so that the devices can communicate with each other.

One disadvantage here is that rapid modification is not possible with such a procedure, and in order to connect or remove a new device, production must be stopped, Inclusion of the production resources or the work cells, respectively, in the network, in particular into an intranet and/or internet, also exposes them to security risks in the network.

The objective of the present invention is therefore to create a method and an apparatus of the type mentioned above whereby, on the one hand, various production resources can be connected to form a work cell and secure data communication with external components outside the work cell is possible and/or, on the other hand, easy communication among the production resources is possible. Another objective is to enable quick and easy adaptation of the work cells.

The objective is achieved by the invention.

The apparatus according to the present invention is characterized in that the production resources are connected to a work cell control, wherein the production resources are automatically detected by the work cell controller, whereupon the work cell controller on the one hand performs the communication or data exchange, respectively, with the preferably company-internal network, in particular an intranet and/or an internet, and on the other hand with the production resources of the work cell, and establishes direct communication among the production resources, whereby it is possible to have a software update performed in the work cell controller during operation of the work cell.

The advantage here is that regardless of the status of the individual production resources of a work cell, the work cell controller can always be kept at the latest security standard without having to stop the production process. Here, the work cell controller or the system structure, respectively, is designed in such a way that in the event of a flawed update, for example when the work cell controller no longer functions correctly, the production process in the work cell continues without restriction. This allows the work cell controller to be deactivated or switched off, respectively, at any time if necessary, or to be reset or downgraded to a previous software version.

Furthermore, the objective of the present invention is also achieved by a method for managing and controlling production resources with one or more work cells, wherein the production resources are connected to a work cell controller, whereby the production resources are automatically detected by the work cell controller, whereupon the work cell controller on the one hand performs the communication or the data exchange with the preferably company-internal company network, in particular an intranet and/or an internet, respectively, and on the other hand with the production resources of the work cell, and establishes direct communication between the production resources, wherein the production resources are assigned an address by the work cell controller when a production resource is connected to the work cell controller, and the work cell controller keeps a list of the resources and functions present in the work cell and distributes this list to the devices, or the devices query this list at preferably regular intervals from the work cell controller.

The advantage here is that the automatic independent detection of newly added or removed devices, in particular production resources, and the list or work cell directory, respectively, created from this, enable easy administration and integration, since the individual devices in the work cell are aware of the existing functions and adjustment options. This also considerably simplifies data exchange with each other and with other devices from another work cell and, for example, with an MES (Manufacturing Execution System) system or a smartphone app, since each device can easily find the assignment of the devices, their addresses and their functions via the list.

Via the company-internal network, the work cell directory is available to a superordinate software as well, in particular to an MES or ERP (Enterprise Resource Planning) system, wherein the logical assignment of production resources to the work cell is automatically determined from the compilation of the respective list.

This creates a so-called "Plug and Produce", in which only the device is connected, preferably via a single line, whereupon all further steps are carried out automatically. Thus, straightforward setup of a work cell that can be changed at any time without IT-specific configurations, as known from the state of the art, is made possible for the first time, i.e. e.g. a work cell consisting of an injection molding machine and a temperature control unit can be easily complemented with a new dryer or a dryer from another work cell, since the processing resource, in particular the injection molding machine, can use the work cell directory, in particular the newly generated list, to generate the additional information required for establishing communication with the newly connected components. It is also made possible thereby to easily remove a component from the work cell, which removal in turn is automatically detected by the work cell controller by striking the component from the work cell directory and thus deactivating its functions. However, it is also advantageous that simple connections or changes to the work cells, respectively, can be performed without specially trained specialists. This is insofar possible because the work cell controller performs the addressing and integration of the production resources into the work cell and at the same time provides or loads the necessary software for operation and adjustment options as well as data exchange with the further production resource located within the work cell.

In the state of the art, such an addition of a component to a work group cell consisting of at least one injection molding machine is possible only in such a way that first a network integration by an expert with a network specialist takes place and then in a superordinate MES or ERP software an assignment of the component to this injection molding machine, for example, must take place manually, so that software adaptation or integration, respectively, with an IT specialist is necessary, which is not necessary with the solution according to the present invention.

This means that it is easily possible for the production resources of a work cell to access the other components of the work cell at any time, and to carry out the communication. Furthermore, the work cell directory of the respective work cell controller allows access from a superordinate software to all the functionalities of the individual components in the work cell. With the help of the device list and the respective functionalities of the devices, it is also easily possible to communicate further information, process data, status, etc. from the central work cell controller to the outside, which significantly improves monitoring and thus safety.

Advantageous embodiments are such in which a means of communication or distributor, respectively, is connected to the work cell controller to which the production resources are plugged in.

This means that the work cell controller needs to comprise only a small, manageable number of work cell inputs and/or outputs, but each work cell can per se have a correspondingly high number of production resources. Preferably, the work cell controller and means of communication have four to seven, in particular seven inputs and/or outputs or slots, respectively, or communication ports for internal communication, and one input and/or output or slot, respectively, or communication ports for external communication each. Of course, it is also possible to connect in turn a further means of communication to the inputs and/or outputs of the means of communication, so that the number of possible production resources can be extended arbitrarily.

However, embodiments are also advantageous in which the work cell controller collects data from the production resources of the work cell which, depending on the addressing/device list/assignment and/or security standard, are transferred from the work cell controller to the outside to the network without an existing MES and/or ERP system or superordinate software having to directly access the production resources. This ensures that although data from the work cells or the production resources are transferred from the work cell controller to the outside into a superordinate network, such as the intranet or internet, any external access from the outside from the network to the work cells or the individual production resources, respectively, is prevented, in particular blocked. This achieves maximum security for the industrial installation, especially for production.

Thus it is no longer possible for a constant or continuous, respectively, data flow with a superordinate medium, in particular the internet, to be established, which greatly facilitates harmful attacks with viruses or other malicious software if a continuous data transfer takes place.

Furthermore, it is possible that a virtual image of the production process or production image, respectively, can be created by forwarding the data, in particular the list with the available production resources, from a suitable software or APP, respectively.

However, embodiments in which the data collected by the work cell controller are mirrored from an internal area with the production resources to an external area for superordinate media, in particular the intranet or internet, are also advantageous. This ensures that no connections to the outside are formed, so that no harmful software can enter. Here it is possible that the data are present twice (once in the internal area and once in the external area) due to mirroring, so that a kind of galvanic separation is created.

Advantageous embodiments are such in which the work cell controller performs a shielding/separation or compartmentalization and monitoring of the data transfer, so that direct data transfer to the components from outside the work cell is only possible with approval by the work cell controller or an authorization key present in the production resource or manually via a user.

This is achieved by providing a security module in the work cell controller system, in which a firewall developed in-house or purchased from a third party can be used, so that cost-effective setup and use as well as secure operation of the system is guaranteed, since the security module can always be kept up to date independently of the operation of the production resources.

Here it is even recommended that automatic performance of the update process of the security module are initiated and carried out independently by the work cell controller in order to always be up to date in the fight against viruses, malware and other harmful programs.

By shielding the production resources via the work cell controller, in the event of an infestation of the company-internal network (intranet) with harmful software or partial failure of the work cell controller it is achieved that the latter is or can be taken, respectively, out of operation, but the production resources of the work cell can continue to operate independently. In particular, the use of the means of communication in the work cells ensures that data transfer throughout the work cell via the means of communication remains ensured, so that in the event of failure of the work cell controller only the data transfer to the outside, i.e. to the superordinate software, in particular an MES or ERP system, will not work.

Advantageous embodiments are such in which, when a production resource is connected to the work cell controller and/or the means of communication, these are automatically detected by the work cell controller, and appropriate software applications and/or adjustment options or functions relating to the newly detected production resource, respectively, are loaded and/or activated, which are transmitted to the new production resource or the already existing production resource for the necessary operation of the work cell, in particular for communication with one another.

This ensures that easy connection or modification, respectively, of the work cells can be performed without specially trained specialists. This is possible insofar because the work cell controller performs the addressing of the components and preferably also loads the necessary software for operation and adjustment options as well as data exchange with the further components located in the work cell.

In the state of the art, such an addition of a component or a production resource, respectively, to a work cell consisting of at least one injection molding machine is possible only in such a way that first a network integration by a specialist takes place and then in a superordinate software, in particular an MES or ERR system, an assignment of the component to, for example, this injection molding machine must be made manually, whereupon the plant user can then carry out the production-specific adjustments and settings.

Further advantageous embodiments are such in which, when a production resource is removed from the work cell, i.e. when it is disconnected from the work cell controller or the means of communication, respectively, this is automatically detected by the work cell controller, whereupon its functions and/or software applications in this work cell are deactivated by the work cell controller.

Further advantageous embodiments are such which automatically detect removal of a production resource from the work cell, i.e. when this is disconnected from the work cell controller or a means of communication, respectively, whereupon the associated functions of the disconnected production resource and/or software applications in this work cell are deactivated by the work cell controller.

This ensures that all adjustment options for the disconnected production resource are deactivated immediately, so that no incorrect settings or allocations can be made that could lead to faulty production processes or to plant standstills. This is important because it is often necessary to have data exchange among the production resources, so that e.g. a production resource waits for a response from the disconnected production resource and hence the functionality of the entire work cell can no longer be guaranteed.

However, it is also advantageous to combine several work cell controllers with a superordinate software, in particular an MES or ERP system or a superordinate work cell controller, wherein a shared device listing or list with preferably a group mapping of the individual work cells, respectively, is created for the superordinate software or sent by the individual work cell controllers and combined to a shared device list and group mapping by the superordinate software.

This makes it possible to create a superordinate entity in which all essential data are collected, monitored and managed when individual components of a work cell are moved to another work cell or new components are added to a work cell.

Further advantageous embodiments are such in which one or all production resources are designed in such a way that they authenticate themselves specifically with the work cell controller system, so that they can release a path, in particular a data communication, directly to themselves to the outside, i.e. from the external network (intranet).

Usually, the standard configuration of the work cell controller allows only communication of the components among each other and from the outside access to the data image of the work cell controller, but no data exchange directly with the production resources. If a component can authenticate itself as a valid work cell component, then it can communicate from the inside to the outside or can be given access to itself from the outside at its own risk, respectively, by automatically setting up corresponding rules in work cell controller, i.e. without an IT technician. This also allows the user interface to be mirrored for service purposes. However, it is essential that external monitoring can be performed for service purposes, i.e. that the manufacturer e.g. reads out the number of strokes of the processing resources and adjusts the service interval on the basis of the strokes performed or the number of mold opening movements, etc.

Advantageous embodiments are such in which the authenticated production resources can establish connections to devices and/or software or apps, respectively, outside the work cell, in particular in the external network.

This means that e.g, appropriate software updates for the production resource can be performed by the manufacturer.

Further advantageous embodiments are such in which the work cell controller prevents direct access to the components, instead permitting only access to a data image.

This means that a virtual data image can be obtained from the outside, particularly via the Internet, using an app or software, respectively, as this is transmitted by the work cell controller system. However, if an attempt is made to access a component or production resource, respectively, directly, this is blocked by the work cell controller. Here it is possible to have the query sent to a user, in particular the production manager, by SMS message or messenger services, such as WhatsApp, etc., to a mobile phone or computer, which has the possibility to approve this particular query or future query.

A further advantageous embodiment is one in which unauthenticated production resources cannot establish a connection to the outside or inside via the work cell controller.

This ensures that non-authorized devices cannot be integrated into the work cell, as their security standard cannot be checked by the manufacturer.

In addition, however, the objective of the present invention is achieved also by an industrial installation or a production system, respectively, in which the production resources are directly connected to a work cell controller system or indirectly via a communication module or distributor, respectively, and the latter are designed for automatic detection by the work cell controller, wherein the work cell controller is designed on the one hand for communication with the company-internal network, in particular an intranet and/or an internet, and on the other hand for communication with the production resources of the work cell via the production network, wherein the work cell controller is designed for loading and installing an update or software update during operation of the production resource.

The advantage here is that the production resources in the work cells do not need to be stopped or switched off, respectively, in order to provide the work cell controller with an update.

Furthermore, however, the objective of the present invention is achieved also by an industrial installation or a production system, respectively, in which the production resources are directly connected to a work cell controller system or indirectly via a communication module, and the latter is designed for automatic detection by the work cell controller, wherein the work cell controller is designed on the one hand for communication with the company-internal network, in particular an intranet and/or an internet, and on the other hand for communication with the production resources of the work cell via the production network, wherein the work cell controller is designed for creating and managing a list or a work directory, respectively, wherein the list or the working directory, respectively, comprises at least one production resource and one assigned address and preferably functions.

The advantage here is that the creation of a list with the most important data, in particular an address and the associated production resource and preferably with functions, enables easy administration and data exchange.

In another advantageous embodiment, the work cell controller is designed so as to load and/or activate software applications and/or adjustment options and/or functions related to the newly detected production resource. This ensures that operating staff are not required to have any specialist knowledge for setting up devices, but all functions and adjustment options are set and selected automatically for them.

In an advantageous embodiment, the production resources, in particular one or more flow controllers, one or more temperature control units, one or more sampling robots or robots, respectively, one or more metering device for granules, one or more granule dryers, one or more camera systems for quality control, etc., are designed for automatic detection by the work cell controller. This ensures that all the necessary devices are available for production.

Finally, in an advantageous embodiment a module, in particular a security and monitoring module, is provided in the work cell controller for shielding of the communication between the connected network and the connected components. This ensures that reliable and easy identification of the production resources is made possible.

BRIEF DESCRIPTION OF THE DRAWINGS

The invention will now be explained in more detail by reference to several exemplary embodiments illustrated in the drawings.

The figures show.

DETAILED DESCRIPTION

It should be stated by way of introduction that, in the individual embodiments, the same parts are provided with the same reference numbers or same component designations, wherein the disclosures contained in the entire description can, by analogy, be transferred to identical parts with identical reference numbers or identical component designations, respectively. The position details selected in the description, such as, e.g., top, bottom, lateral, etc., likewise relate to the figure described, and in the event of a change of position, they are to be transferred to the new position by analogy. Individual features or feature combinations from the exemplary embodiments shown and described may also represent independent inventive solutions.

Figure 1:
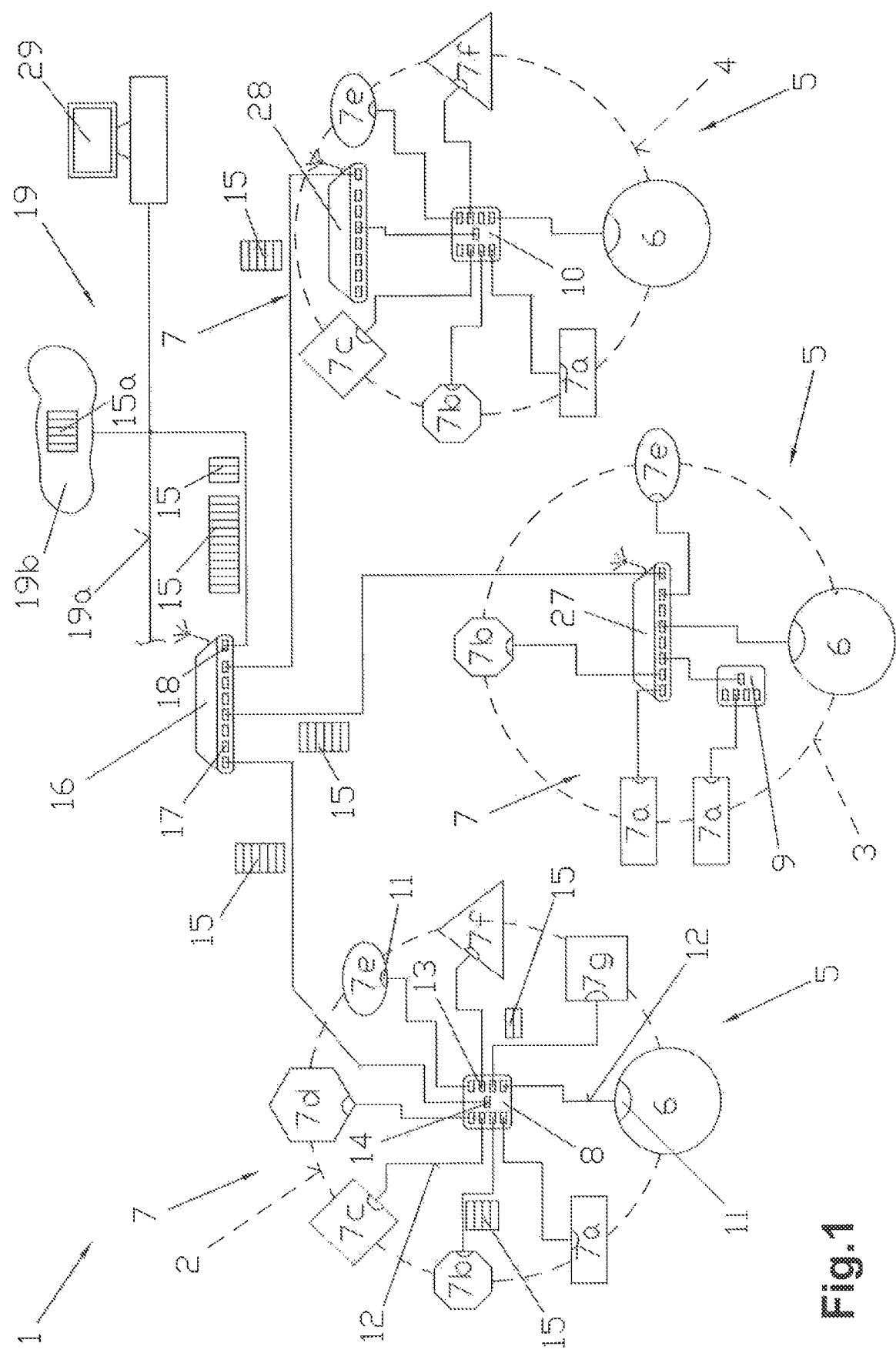
FIG. 1—an overview illustration of a plastics processing industrial installation, simplified, for illustrative purposes only.
Figure 2:
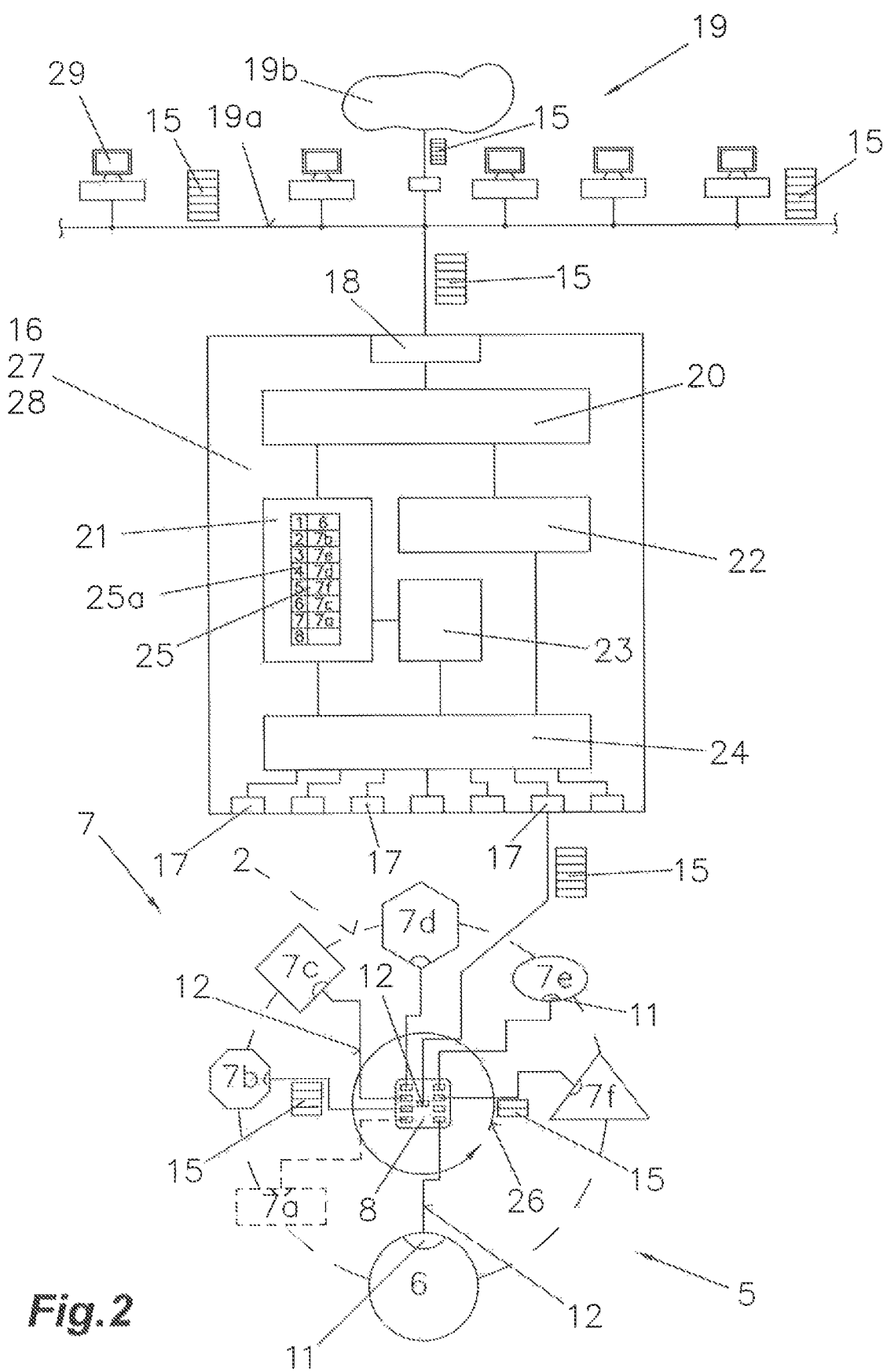
FIG. 2—a schematic illustration of a structure of a work cell controller for use in an industrial installation according to FIG. 1, simplified, for illustrative purposes only.

As a matter of principle, it should be mentioned with regard to the exemplary embodiments in FIGS. 1 and 2 that the use is preferably in a plastics-processing industry 1 or industrial installation 1, respectively.

FIGS. 1 and 2 show industrial installation 1 with one or more work cells 2 to 4, wherein certain production resources 5 are organized in work cells 2 to 4. The production resources 5 preferably consist of at least one processing machine 6 of the plastics-processing industry 1, in particular an injection molding machine 6, and at least one peripheral device 7. The peripheral devices 7 can be selected, for example, from among a temperature control unit 7a, a robot or sampling robot, respectively 7b, a metering device 7c for granules, a granule dryer 7d, a granule conveyor 7e, a camera system 7f for quality control, an automatic flow controller 7g, etc., as shown schematically. Here it is possible that several production resources of the same type 5 are provided and managed in a work cell 2 to 4.

In the exemplary embodiment illustrated in FIG. 1, the production resources 5 in a work cell 2 to 4 are connected to a means of communication 8 to 10, in particular a switch 8 to 10, i.e. each processing device 6 and peripheral device 7 is preferably equipped with a communication and/or detection module 11 implemented in hardware or software for better detection. The production resources 5 are connected via a cable, in particular a commercially available interface cable 12, with one input/output 13 each, to the means of communication 8 to 10, wherein wireless connection, for example via WLAN, is also possible. It is possible that the means of communication 8 to 10 has several inputs/outputs 13, in particular seven, wherein, however, different versions of means of communication 8 to 10 with more or fewer inputs/outputs 13 can also be used. It is also possible that no means of communication is used and the processing device 6 and the peripheral devices 7 are connected directly to a work cell controller 27, 28 as shown in work cell 3.

It is also possible that several such means of communication 8 to 10 are provided in a work cell 2 to 4, i.e. when the inputs/outputs 13 are completely occupied by at least one processing device 6 and peripheral devices 7, a peripheral device 7 is disconnected and a further means of communication 8 to 10 is connected to its input/output 13, whereupon this is connected to these further means of communication 13 and thus further processing devices 6 and/or peripheral devices 7 can still be connected to the free inputs/outputs 13 of the newly added means of communication 8 to 10. As can be seen from FIG. 1, it is possible that the individual work cells 2 to 4 are equipped differently, i.e. each work cell 2 to 4 has a different number of production resources 5.

In addition, means of communication 8 to 10 have a communication input and/or output 14 to which a work cell controller 16 or 27, 28 is connected. This connection is used for communication or data exchange 15, in particular for forwarding and receiving data packets or data records, respectively 15, as shown schematically, to the work cell controller 27, 28 or possibly to a superordinate entity, for example the work cell controller 16, a preferably company-internal network 19, in particular an intranet 19a and/or an internet 19b. As a matter of principle, it should be mentioned that the work cell controllers 27, 28 are in turn connected to a superordinate work cell controller 16 in order to generate further hierarchical work cell structures in an industrial installation 1.

In such an industrial installation 1, each work cell 2 to 4 operates independently of the other work cells 2 to 4, i.e. each work cell 2 to 4 always contains those production resource 5 required for the manufacture of a specific product. For example, in the illustrated industrial installation 1 in work cell 2 a mold for an injection-molded item could be used, which requires a temperature control unit 7a for temperature control, a robot 7b for gentle removal and a metering device 7c for the correct composition of the plastic granules to be processed, a dryer 7d for drying the plastic granulate, a conveyor 7e for conveying the granulate to the plasticizing and injection unit of the processing machine, a camera system 7f for checking the finished product, and a flow controller 7g for automatic flow control through the mold. In either work cell 3 and 4, fewer peripheral devices are required for production.

It is therefore necessary to ensure flexible and product-dependent operation of such an industrial installation 1 and not to expose it to any external hazards, in order to avoid major damage to the manufacturer, in particular an operational breakdown of the industrial installation 1. To make this possible, the work cell controller 16, 27, 28 is equipped as shown in FIG. 2.

The work cell controller 16, 27, 28 has a security and monitoring module 20 that is connected to the network input and/or output 18 and is preferably designed as a LAN interface for the company-internal network 19 or other work cell controllers 16, 27, 28. The security and monitoring module 20 is connected to an allocation module 21 (routing core and port forwarding) on the one hand and a server module 22 on the other hand. Furthermore, a plug and production module 23 is provided in the work cell controller 16, 27, 28, which is connected to the allocation module 21. The allocation module 21, the server module and the plug and production module 23 are connected to a further security and monitoring module 24, to which the work cell inputs and/or outputs 17, which in turn are provided in the form of standard LAN interfaces, are connected.

Furthermore, FIG. 2 shows how a means of communication 8 is connected to the work cell input and/or output 17 with the production resources 5 connected thereto.

According to the present invention, it is now envisioned that on the one hand the operational safety of the industrial installation 1 will be increased and that production resources 5 will be kept harmless from external dangers, such as viruses, malware and other harmful programs, by the work cell controller 16, 27, 28, and that on the other hand easy adaptation of the individual work cells 2 to 4 is possible.

To this end, the work cell controller 16, 27, 28 is designed in such a way that the production resources 5 are automatically detected by the work cell controller 16, 27, 28, whereupon the work cell controller 16, 27, 28 on the one hand performs the communication or data exchange with the preferably company-internal network 19, in particular an intranet 19a and/or an internet 19b, respectively, or other work cell controllers 16, 27, 28 and on the other hand with the production resources 5 of the work cell 2 to 4 and the production resources 5 among themselves, wherein during the operation of the work cell 2 to 4 in the work cell controller 16, 27, 28 a software update 15a (as shown schematically in FIG. 1), as shown with dashed lines, in the network 19, in particular in the internet 19b, can be performed. I.e., when a processing machine 6 and/or a peripheral device 7 is connected to the inputs/outputs 13 or the work cell inputs and/or outputs of 17, this is detected via the plug and production module 23, whereupon a data exchange is carried out between the newly connected production resource 5 and the plug and production module 23, in which its data are transmitted by the production resource 5 via the communication and/or detection module 11 for assignment, i.e. that these are formed in such a way that they are automatically detected by the work cell controller 16, 27, 28, for which purpose the production resources 5 are equipped with a corresponding software and/or hardware, in particular the communication and/or detection module 11 implemented in hardware or software. Here it is possible that an internal software update 15a and/or software applications and/or adjustment options and/or functions concerning the newly added production resource 5 are loaded by the newly connected production resource 5 or by the work cell controller 16, 27, 28 from the network 19 or a connected storage device and, if necessary, distributed to the other already connected production resources 5. The automatic detection and updating of the newly added functions makes it possible to adapt the work cell 2 to 4 quickly and easily.

For example, in work cell 2, a new temperature control unit 7a (as shown with dashed lines in FIG. 2) with an increased temperature range for the temperature control of the mold in the processing machine 6 used, in particular the injection molding machine, is added, i.e. connected to the communication module 8 by simply plugging it in via an interface cable 12. The plug and production module 23 of the work cell controller 27, 28 or 16, respectively, then detects this, as it contacts the communication modules 8 to 10 and its own inputs or outputs 17 at regular intervals or performs a query, respectively, whereupon the new temperature control unit 7a sends an identifier or code assigned for this device configuration to the plug and production module 23, preferably from the new temperature control unit 7a. The plug and production module 23 e.g. now checks the transmitted code with stored codes and then detects that a temperature control unit 7a has been added in work cell 2, so that the same forwards the information to the management module 21.

The management module 21 assigns an address 25a to the newly added production resource 5, in particular the temperature control unit 7a, which is sent to the newly added production resource 5 via the security and monitoring module 24, which checks the data traffic for viruses and malware. At the same time, the management module 21 includes the production resource 5, in particular the newly added temperature control unit 7a, into a list 25 or a work cell directory 25, respectively, as shown schematically, of all existing production resources 5, i.e upon connection of a production resource 5 to a work cell controller 16, 27, 28 or a communication module 8 to 10, the production resources 5 are assigned an address 25a by the work cell controller 16, 27, 28, and the work cell controller 16, 27, 28 keeps a list 25 of the devices or production resources 5 present in the production resource network 26 and distributes the same to the devices, or the devices query this list 25 or the work cell directory 25, respectively, from the work cell controller 16, 27, 28 at preferably regular intervals, By creation of the list 25, each production resource 5 can easily detect the production resources 5 present in its work cell 2 to 4 and perform a data exchange via the production resource network 26.

The list 25 or the work cell directory 25 can comprise several pieces of information, such as an address, a device type, possible functions or special function information, respectively, etc.

It is essential for the industrial installation 1 according to the present invention that anyone can add or disconnect, respectively, production resources 5, so that no skilled staff, such as IT specialists for connecting to the network and/or skilled staff for configuring the functions, etc., are required, since any required software application is loaded from the work cell controller 16, 27, 28 and/or any required adjustment options and sequence controls are authorized by this or the associated processing device 6. Thus, immediately after connection of a new production resource 5 to a work cell 2 to 4, the corresponding settings/functions can be carried out on the corresponding processing device 6 and the peripheral devices 7. Here it is of course possible that the individual devices can additionally be mechanically connected to each other.

Likewise, the work cell controller 16, 27, 28, in particular the plug and production module 23, detects removal of a production resource 5 from a work cell 2 to 4, whereupon the device is struck from the list 25 and further necessary steps are carried out, i.e. when a component is removed from work cell 2 to 4, that is to say from work cell controllers 16, 27, 28, this is automatically detected by the corresponding work cell controller 16, 27, 28, whereupon its functions and/or software applications in this work cell 2 to 4 are deactivated by the work cell controller 16, 27, 28 and/or preferably the processing device 6. Here it is essential that all connections from the disconnected device to the production line be deactivated or replaced by the work cell controller 16, 27, 28 or the processing device 6, respectively, so that no production standstill occurs if other production resources 5 should wait for feedback from the disconnected device, which can lead to a production standstill due to non-existence of the device.

Here it is also possible that the work cell controller 16, 27, 28 monitors the production process in this work cell 2 to 4 after the removal of a peripheral device 7, so that after a query or polling, e.g. return temperature with a temperature control unit 7a, to the address of the disconnected device this is detected by the work cell controller 16, 27, 28 and replaced by appropriately stored replacement steps. The monitoring can be carried out for one or several production processes run in succession, whereupon the monitoring mode is deactivated again. It is also possible that such special approvals are collected and forwarded by the work cell controller 16, 27, 28 via the network 19 to the appropriate entities so that these so-called error messages can be corrected.

It is also possible, as it often happens in such industrial installations 1, that individual peripheral devices 7 are moved from one work cell 2 to 4 to another work cell 2 to 4, which is easily possible according to the present invention without skilled staff, because the peripheral device 7 is deactivated by the work cell controller 16, 27, 28 in the one work cell 2 to 4 and is struck from the list 25, whereupon upon connection or coupling, respectively, in another work cell 2 to 4 this is detected as a new device by the corresponding work cell controller 16, 27, 28 and in turn included into the respective list 25 with assignment of the new work cell 2 to 4.

The list 25 is distributed by the work cell controller 16, 27, 28 to the individual production resources 5, so that each device receives all the data or functions, respectively, of the devices in operation. Preferably, however, the production resources 5, in particular the processing machine 6, query the list 25 at regular intervals from the work cell controller 16, 27, 28, as this requires all information for the production process in order to be able to adapt it if necessary. When using a plurality of work cell controllers 16, 27, 28, it is possible that list 25 is managed by only one work cell controller 16, 27, 28.

In addition, it is also possible to display a user interface for the newly added or all production resources 5 on the terminal of processing machine 6, in particular the injection molding machine, so that all production resources can additionally be operated from this central terminal. This makes it possible for software components to be loaded into the processing machine 6, in particular the injection molding machine, and for the data to be collected from the production resources 5, so that the parameters of all components that are important for the quality of the parts can be logged centrally in a table on the processing machine 6, in particular the injection molding machine. For example, the production parameters for the mold (product) installed in processing machine 6, especially the injection molding machine, can be stored at a central location and distributed from there to all components. It is advantageous here if the storage takes place in the processing machine 6, for example an injection molding machine or the MES system. This makes it possible to check whether all the components that must have been introduced into the work cells 2 to 4 for the production of the product are actually present in the work cell 2 to 4. Thus, it can be said that a plurality of work cell controllers 16, 27, 28 are connected to a superordinate software, in particular an MES or ERP system, or a superordinate work cell controller 16, 27, 28, or that these are installed in the work cell controller 16, 27, 28, wherein the superordinate software creates a shared device listing or list 25, respectively, with preferably a group mapping of the individual work cells 2 to 4, or has it transmitted from the individual work cell controllers 16, 27, 28 and the same is combined to form a shared device listing 25 and group mapping 25 by the superordinate software. This ensures in a simple way that by forwarding the list 25 each has all the information at its disposal and can filter out the information it needs. However, since it is often necessary for the work cell controller 16, 27, 28 to load corresponding software applications from the network 19, appropriate security precautions need to be taken, i.e. the data transfer must be precisely controlled by the security and monitoring module 20, 24. Preferably an in-house firewall is installed and used in the work cell controller 16, 27, 28. Here it is possible that in case of a plurality of work cell controllers 16, 27, 28, only the work cell controller 16, 27, 28 that is connected to the network 19, is equipped with the firewall. It is also possible to integrate an external firewall, especially a third-party firewall, into the work cell controller 16, 27, 28.

The work cell controller 16, 27, 28 is designed in such a way that a software update 15a can be performed in the work cell controller 16 during operation of work cells 2 to 4, i.e. the operation of industrial installation 1, in particular of the production resource 5 in work cells 2 to 4, does not have to be stopped when a software update is carried out, as communication between one another can continue without restriction via the production resource network 26. This means that the work cell controller 16, 27, 28 can always be kept to the latest security standard, so that optimum protection of the system is guaranteed. It is also possible that the work cell controller 16, 27, 28 can fail due to problems during the installation of the update, without interrupting the operation of the system. This is possible because the production resources 5 can still communicate with each other via the production resource network 26 of the individual work cells 2 to 4.

Furthermore, the work cell controller 16, 27, 28 is equipped in such a way that these collect the data of the production resources 5 of the work cells 2 to 4. For this purpose, the work cell controller 16, 27, 28 may have an internal or connected memory (not shown) on which the data are temporarily or permanently stored. Of course it is possible, however, that the data are categorized by the work cell controller 16, 27, 28, for example by addressing 25a device list 25/assignment and/or security standard, and forwarded directly to the network 19 to an external component, for example a computer 29. Another possibility is that the collected data are mirrored from an internal area for the work cells 2 to 4 to an external area for superordinate media or the network 19, respectively, so that a so-called galvanic software separation is created. It is possible that the data are stored in an internal memory (work cell side) and an external memory (network side).

The work cell controller 16, 27, 28, in particular that which is connected to the external network 19, has the task of carrying out a shielding/separation or compartmentalization and monitoring of the data transfer 15 preferably via the security and monitoring modules 20, 24, or is correspondingly designed for shielding/separation or compartmentalization and monitoring of the data transfer 15, respectively. Direct data transfer 15 to the production resources 5 from outside work cells 2 to 4, i.e. from the network 19, is possible only with approval by the work cell controller 16, 27, 28 or an authorization key present in production resource 5 or manually via a user. This means that only under certain circumstances is data transfer 15 with the processing device 6 or a peripheral device 7 permitted by the work cell controller 16, and all other attempts are blocked. To enable direct access from the outside, i.e. from network 19, via work cell controller 16, 27, 28 to the production resource 5 internally, the authorization key must be stored in the work cell controller 16, 27, 28 or production resources 5, which can be invoked at any time by work cell controller 16, 27, 28.

Here it is also possible that one or more production resources 5 are designed in such a way that they authenticate themselves specifically with the work cell controller 16, 27, 28, whereby a connection for these special production resources 5 to the outside is released by the work cell controller 16, 27, 28. Subsequently, they can activate a path, in particular a data communication 25, directly to themselves from the outside, i.e. an external network 19, in particular the intranet 19a, This allows these specially equipped production resources 5 to establish a connection to devices and/or software or apps, respectively, outside the work cell 2 to 4.

In order to increase safety, however, it is possible for a user to make special settings on the work cell controller 16, 27, 28. For example, the work cell controller 16, 27, 28 can be set to prevent direct access to the components or production resource 5, respectively, but only to allow access to a data image. It is also possible that when an attempt is made to connect from the network 19 to a production resource 5 or vice versa, the work cell controller 16, 27, 28 is set to manual authorization, so that when a connection request is made this is sent to a user, in particular the user's computer, mobile phone or tablet, who then releases a manual release, for example by pressing a confirmation button.

Furthermore, it is possible that a physical slot of the communication port, in particular of the inputs and/or outputs 13 and/or the network inputs and/or outputs 17, is coded on the communication module 8 to 10 or on the work cell controller 16, 27, 28, respectively, and thus loaded/configured according to "functionality" from the information where exactly a device was plugged into the communication module 8 to 10 or work cell controller 16, 27, 29. Often, for example, several production resources of a particular type (typically temperature control unit 7a) are required in a work cell 2 to 8, which must be kept apart accordingly. The production resources 5, in particular in this example the temperature control unit 7a, may then differ only by serial number, but be identical in terms of their function, or the production resources 5 differ in the temperature range that can be covered by the process technology, respectively. Here, such production resources 5 with a wider temperature range can also be used for work at a lower temperature range. For the process, especially of the production line, it is important to know which temperature control hoses/ cooling hoses/metering screws are connected to the device. This assignment is, for example, queried manually by the operator after the component has been detected by the work cell controller 16, 27, 28. Alternatively, this information can be coded in the slot of the work cell controller 16, 27, 28, whereby the operator must select the correct slot, but does not have to answer any further questions on the control panel, wherein the stored codings can simply be queried via the control panel. In addition, confirmation queries can also be stored for such a function, so that in the event of an incorrect connection, this is detected and displayed on the control panel. The user can then simply disconnect the device and reconnect it to the correct slot. As a matter of principle, the work cell controller 16, 27, 28 or the software for the control panel, respectively, can be designed in such a way that after the plugged-in production resource 5 has been detected, it displays a proposal for the correct slot if the slot is incorrect.

Since a very high security standard is guaranteed in the method or industrial installation, respectively, according to the present invention, the work cell controller 16, 27, 28 is preferably designed in such a way that an unauthenticated production resource 5, as a production resource 5 without the hardware- and/or software-equipped communication and/or detection module 11, cannot establish a connection to the outside or inside via the work cell controller. These are usually devices by third-party manufacturers that do not meet the security standard. In order to integrate such devices, the work cell controller 16, 27, 28 can be manually configured to enable at least internal operation with a third-party product.

As already described, the major advantage of this apparatus or method, respectively, is that, on the one hand, the work cell controllers 16, 27, 28 can be updated during operation of the production resources without a need to switch off the production resources, so that security can always be maintained at the latest standard, and, on the other hand, easy modification/conversion of work cells 2 to 4 with the a wide variety of production resources 5 is possible without skilled staff through "Plug and Produce", since automatic detection takes place and all necessary precautions, such as loading software applications, activating functions, etc., are performed automatically for the production resources 5 by the work cell controller 16, 27, 28.

It is pointed out that the invention is not limited to the embodiments shown, but may comprise further embodiments.

The invention claimed is:

1. Method for managing and controlling production resources in one or more work cells, wherein the production resources are organized into work cells, each of which comprises at least one processing machine of a plastics-processing industry and at least one peripheral device, wherein the at least one peripheral device includes temperature control units, robots or extraction robots, respectively, metering devices for granules, granule dryers, granule conveyors, camera systems for quality control, automatic flow controllers that are interconnected via a network, wherein the production resources are connected to a work cell controller, said method comprising:
   automatically detecting the production resources by the work cell controller;
   loading and/or activating corresponding software applications and/or setting options or functions relating to the detected production resources, respectively;
   transmitting said software applications and/or setting options or functions to the detected production resources or to already existing production resources for a necessary operation of the work cell of the detected production resources; and
   initiating a communication or data exchange by the work cell controller on one hand, respectively, with the network and with the production resources of the work cell and, on another hand, establishing direct communication of the production resources of the work cells with each other, wherein it is possible for a software update to be carried out in the work cell controller during the operation of the work cell.

2. Method according to claim 1, wherein:
   a means of communication or distributor, respectively, to which the production resources are connected, is connected to the work cell controller.

3. Method according to claim 2, wherein:
the data collected by the work cell controller are mirrored from an internal area with the production resources into an external area for superordinate media.

4. Method according to claim 1, wherein:
the data from the production resources of the work cell are collected by the work cell controller, which data, depending on addressing/device list/assignment and/or security standard, are passed from the work cell controller to the outside to the network, without an existing MES (Manufacturing Execution System) and/or ERP (Enterprise Resource Planning) system, or superordinate software having to directly access the production resource.

5. Method according to claim 1, wherein:
the work cell controller carries out a shielding/separation or compartmentalization and monitoring of the data transfer so that direct data transfer to the production resources from outside the work cell is enabled only upon release by the work cell controller or with an authorization key present in the production resource or by manual approval via a user.

6. Method according to claim 1, wherein:
when a production resource is removed from the work cell, that is, when this is disconnected from the work cell controller or a means of communication, respectively, this is automatically detected by the work cell controller, whereupon the functions belonging to the removed production resource in this work cell are deactivated by the work cell controller.

7. Method according to claim 1, wherein:
a plurality of work cell controllers are connected to a superordinate software, wherein the superordinate software creates a shared device listing or list, respectively, with preferably one group mapping of the individual work cells, or has it transmitted from the individual work cell controllers, respectively, and the same is combined by the superordinate software to form a shared device list and group mapping.

8. Method according to claim 7, wherein:
authenticated production resources are configured to establish connections to devices and/or software or apps, respectively, outside the work cell.

9. Method according to claim 7, wherein:
unauthenticated production resources cannot establish a connection to outside or inside via the work cell controller.

10. Industrial installation or production system, respectively, according to claim 9, wherein:
a module for shielding communication between the connected network and the connected components is provided for the work cell controller.

11. Method according to claim 1, wherein:
one or all of the production resources are configured in such a way that they authenticate themselves specifically with the work cell controller so that they can activate a path directly to themselves from outside, that is, from an external network (intranet).

12. Method according to claim 1, wherein:
the work cell controller prevents direct access to components or production resources, respectively, and permits solely access to a data image.

13. Industrial installation or production system, respectively, set up for carrying out the method according to claim 1, said industrial installation or production system comprising:
at least one or several working cells, wherein one or several production resources are arranged in a working cell, wherein the production resources comprise at least one processing machine of a plastics-processing industry and at least one peripheral device, wherein the peripheral devices comprising a temperature control unit, a robot or extraction robot, respectively, a metering device for granules, a granule dryer, a granule conveyor, a camera system for quality control, an automatic flow controller, wherein the production resources are connected directly to a work cell controller or indirectly via a communication module and these are configured for automatic detection by the work cell controller, wherein the work cell controller is configured for loading and/or activating software applications and/or setting options and/or functions relating to the detected production resources, and the work cell controller is configured, on one hand, for communication with a company's internal network and, on another hand, for communication with the production resources of the work cell via a production resources network, wherein the work cell controller is configured for loading and installing an update or software update, respectively, during operation of the production resources.

14. Industrial installation or production system, respectively, set up for carrying out the method according to claim 1, comprising:
at least one or several working cells, wherein one or several production resources are arranged in a working cell, wherein the production resources comprise of at least one processing machine of the plastics-processing industry and at least one peripheral device, wherein the peripheral devices comprise a temperature control unit, a robot or extraction robot, respectively, a metering device for granules, a granule dryer, a granule conveyor, a camera system for quality control, an automatic flow controller, wherein the production resources are connected directly to a work cell controller or indirectly via a communication module and these are configured for automatic detection by the work cell controller, wherein the work cell controller is configured for loading and/or activating software applications and/or setting options and/or functions relating to the detected production resources, and the work cell controller is configured, on one hand, for communication with a company's internal network and, on another hand, for communication with the production resources of the work cell via a production resources network, wherein the work cell controller is configured for creating and managing a list or a working directory, wherein the list or the working directory, respectively, comprises at least one production resource and an assigned address and preferably functions.

15. Method for managing and controlling production resources in one or several work cells, wherein the production resources are organized into work cells, each of which comprises at least one processing machine of the plastics-processing industry and at least one peripheral device, wherein the peripheral devices are temperature control units, robots or extraction robots, respectively, metering devices for granules, granule dryers, granule conveyors, camera systems for quality control, automatic flow controllers that are interconnected via a network, wherein the production resources are connected to a work cell controller, said method comprising:

automatically detecting the production resources by the work cell controller;

loading and/or activating corresponding software applications and/or setting options or functions relating to the detected production resources, respectively;

transmitting said software applications and/or setting options or functions to the detected production resources or to already existing production resources for a necessary operation of the work cell of the detected production resources;

initiating a communication or data exchange by the work cell controller on one hand, respectively, with the network and with the production resources of the work cell and, on another hand, establishing direct communication of the production resources of the work cells with each other, wherein upon connection of a production resource to the work cell controller the production resources are assigned an address by the work cell controller and the work cell controller keeps a list or a work cell directory, respectively, of the production resources and functions present in the work cell and distributes them to the production resources, or the production resources query said directory from the work cell controller.

16. Method according to claim 15, wherein:

the query of said directory by the production resources comprises a query of said directory at regular intervals from the work cell controller.

* * * * *